United States Patent [19]

Kassai

[11] 4,435,012
[45] Mar. 6, 1984

[54] SEAT ASSEMBLY FOR BABY CARRIAGES

[75] Inventor: Kenzou Kassai, Osaka, Japan

[73] Assignee: Kassai Kabushikikaisha, Osaka, Japan

[21] Appl. No.: 323,447

[22] Filed: Nov. 20, 1981

[30] Foreign Application Priority Data

Dec. 2, 1980 [JP] Japan .................... 55-170452

[51] Int. Cl.³ .............................. B60N 1/02
[52] U.S. Cl. ..................... 297/355; 280/643; 280/648; 297/377; 297/357
[58] Field of Search .............. 297/355, 353, 61, 340, 297/377, 357, 354, 130; 280/643, 648; 5/66, 67, 68

[56] References Cited

U.S. PATENT DOCUMENTS

| 2,743,937 | 5/1956 | Ginsberg | 280/643 |
|---|---|---|---|
| 2,781,225 | 2/1957 | Heideman | 280/648 |
| 2,872,203 | 2/1959 | Hedstrom | 280/643 |
| 2,917,316 | 12/1959 | Gill | 280/643 |
| 3,019,028 | 1/1962 | Hedstrom | 280/648 |
| 3,061,328 | 10/1962 | Konar | 297/357 |
| 3,248,125 | 4/1966 | Gill | 280/643 |
| 4,265,466 | 5/1981 | Kassai | 280/648 |

Primary Examiner—Francis K. Zugel
Assistant Examiner—M. Binder
Attorney, Agent, or Firm—W. G. Fasse; D. H. Kane, Jr.

[57] ABSTRACT

A seat assembly for baby carriages comprising a backrest and a head guard which are connected to each other, and a seat shaping member abutting against the back surface of the backrest. The seat shaping member is installed so as to be turned as the angle of inclination of the backrest is changed. The seat shaping member controls the position of the backrest such that when the backrest is in its relatively raised state, substantial alignment between the backrest and head guard is obtained, with the head guard being relatively lowered. If it is deformed into a bed form, the bent state of the backrest and head guard is obtained and the head guard performs its inherent function as a head guard.

5 Claims, 25 Drawing Figures

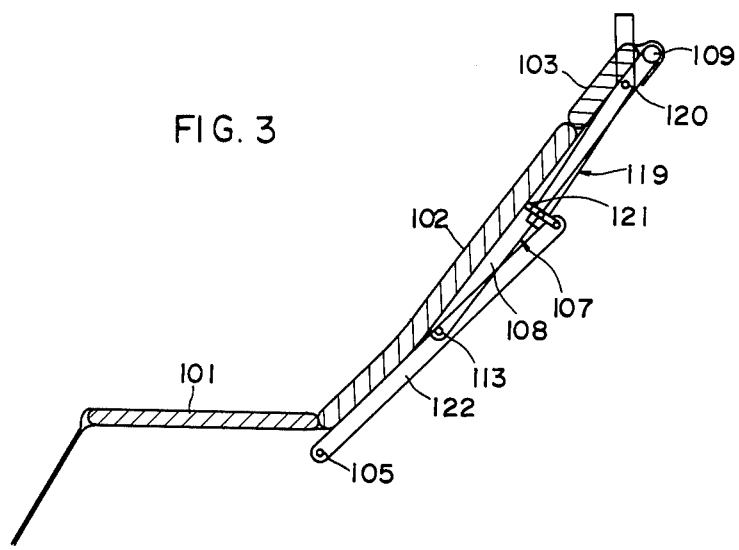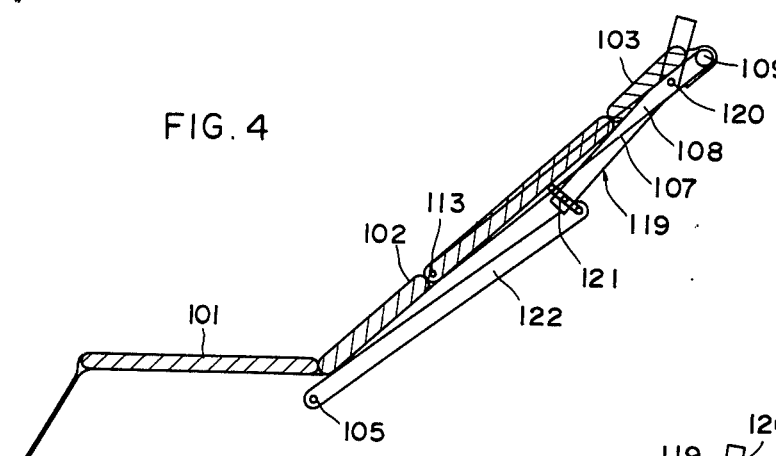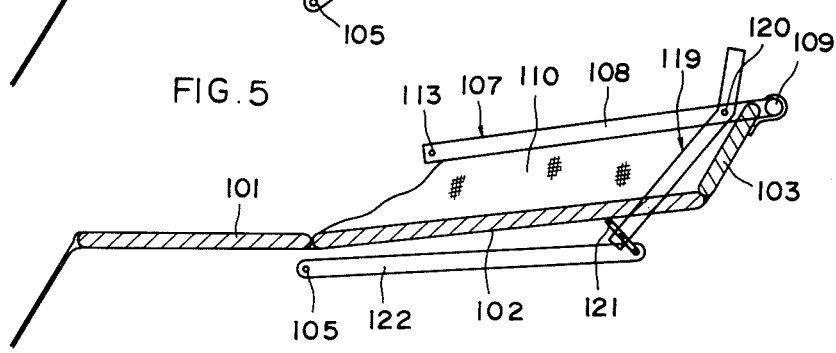

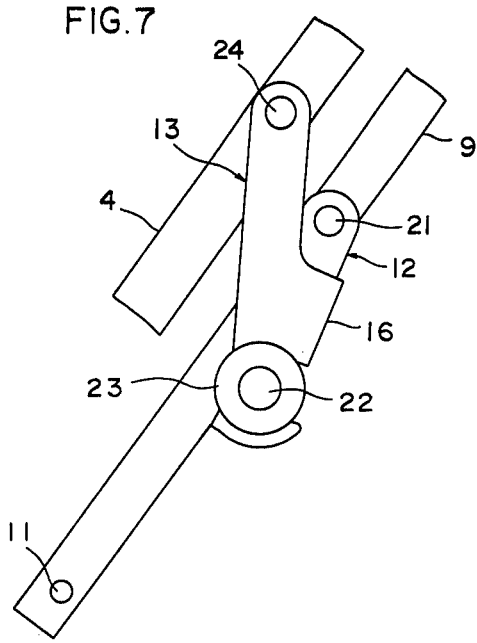
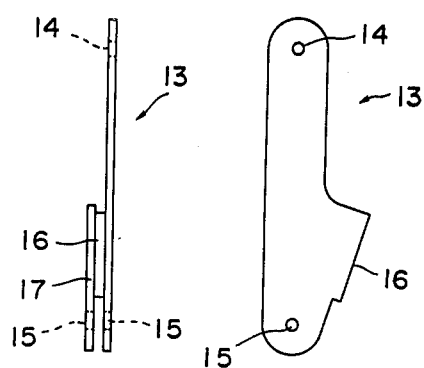
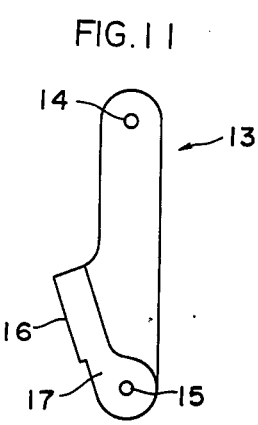
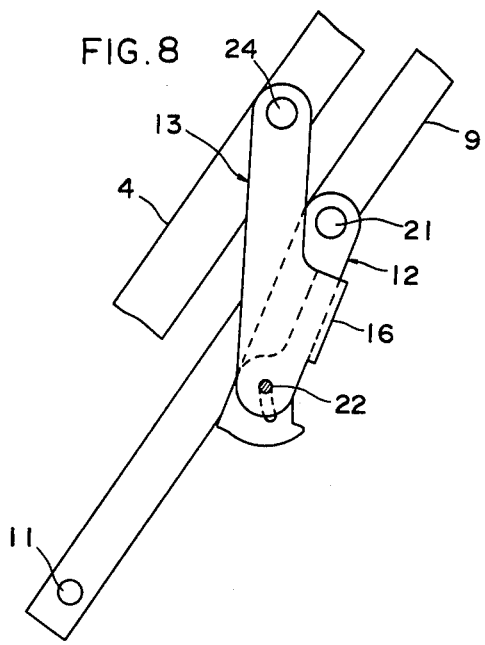
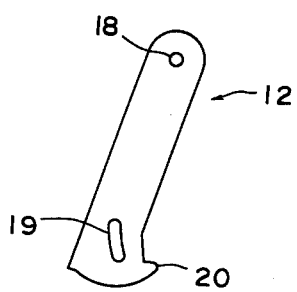

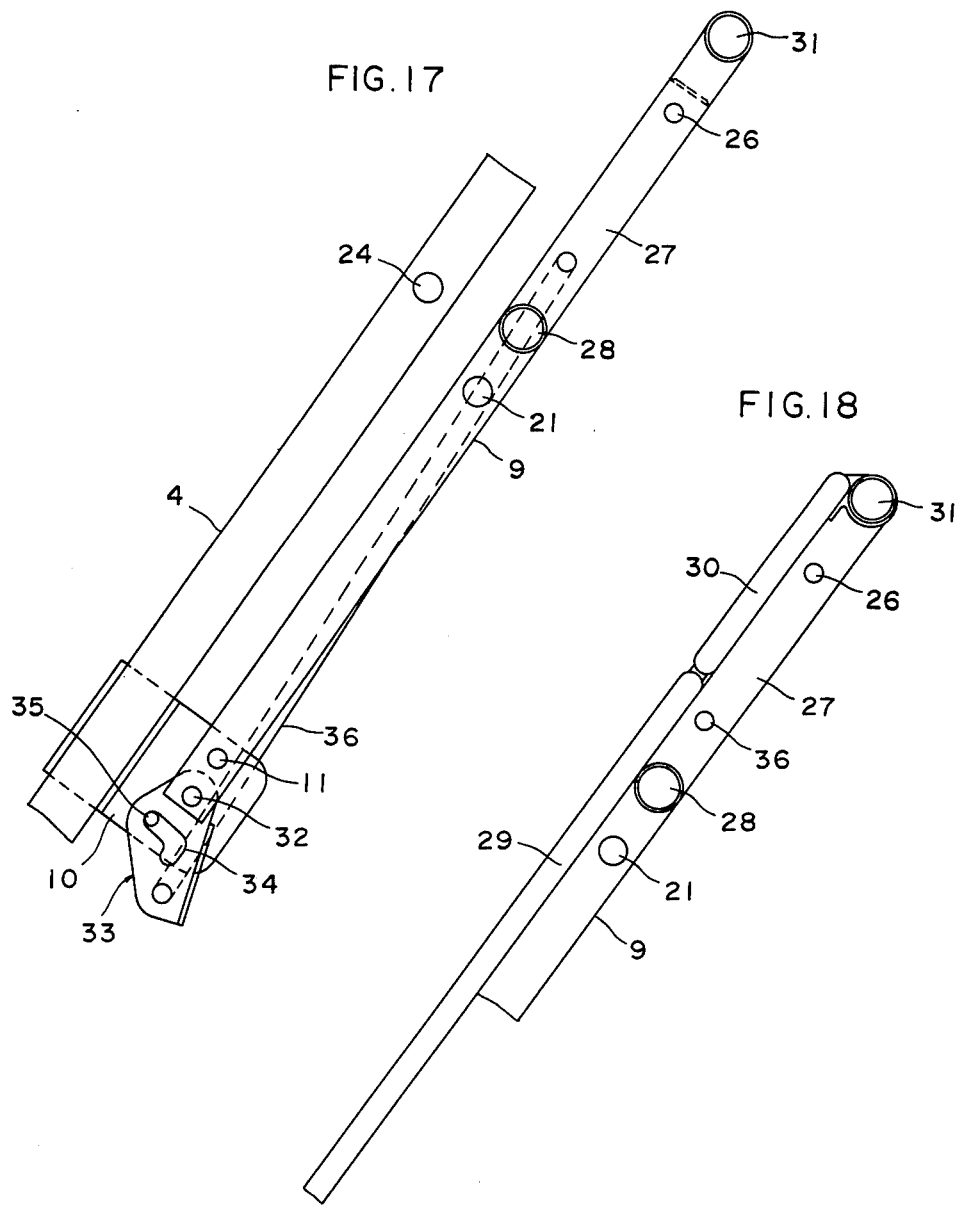

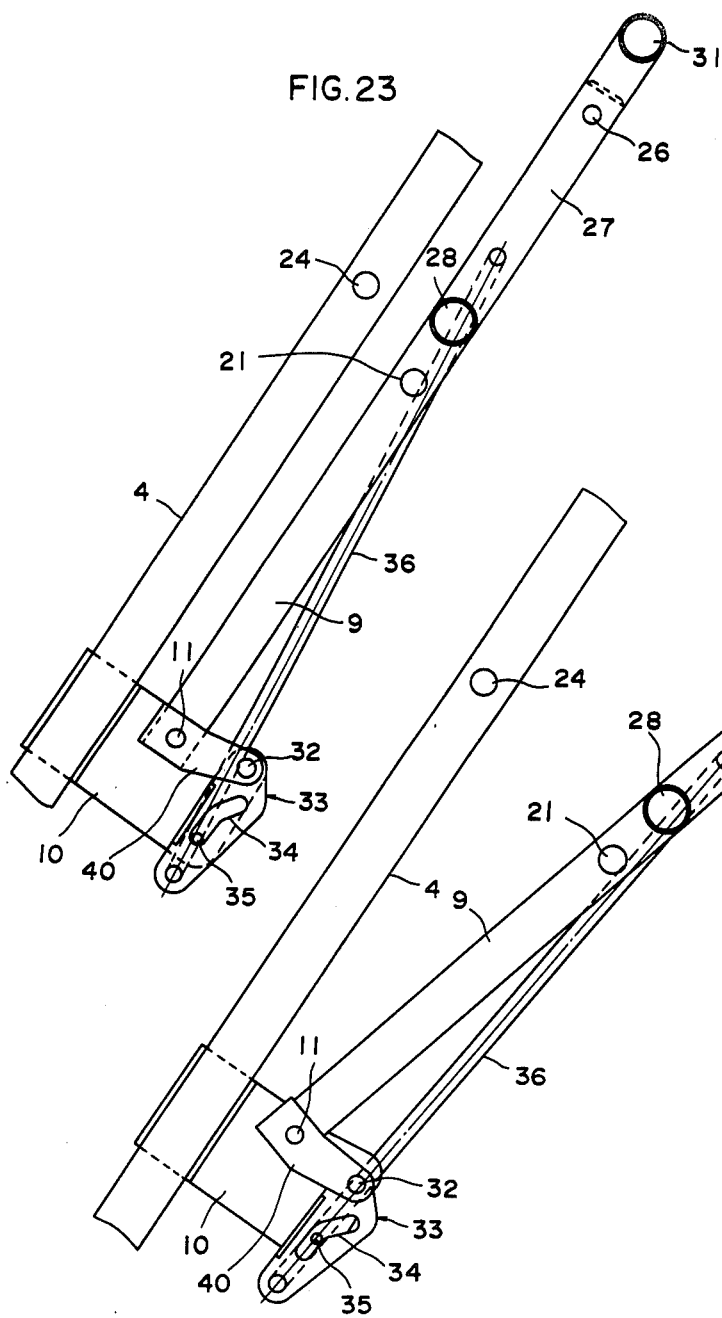

SEAT ASSEMBLY FOR BABY CARRIAGES

BACKGROUND OF THE INVENTION

1. Field of the Invention

This invention relates to a seat assembly for baby carriages and particularly to improvements in the manner of shaping such a seat assembly to provide a bed form when the backrest is lowered.

2. Description of the Prior Art

As far as seat assemblies for baby carriages are concerned, a chair type, including a seat and a backrest is popular. In such a seat assembly, where the backrest is designed so that its angle of inclination can be changed, its shape can be changed into a bed form.

Safety standards concerning baby carriages dictate the attachment of a head guard to the seat when it assumes a bed form. Such a head guard is positioned opposite in relation to the head of a baby placed in the baby carriage, and prevents the baby from sticking its head out or slipping off of the seat headlong.

The head guard is needed only when the seat assumes a bed form. When the sitting quality or comfort of babies is considered, it is undesirable that the head quard be present above the baby's head even after the backrest has been raised. With the back rest in its raised position, therefore, it is desirable that the head guard extends substantially in the same plane as the backrest until the latter is lowered to assume a bed form, whereupon the head guard is positioned above and in an opposed relation to the baby's head.

SUMMARY OF THE INVENTION

Accordingly, the main object of this invention is to provide a seat assembly for baby carriages which meets the above requirement.

In brief, this invention meets the above requirement by foldably connecting a backrest and a head guard, which are each constructed with a hard core material incorporated therein, to each other, connecting foldable lateral surface portions, formed of a foldable sheet material, at least to opposed lateral edges of the backrest, to thereby form a bag, and providing a seat shaping member for suitably shaping said bag, said seat shaping member being adapted to be actuated according to changes in the angle of inclination of the backrest.

According to this invention, the backrest and head guard are connected to each other, and the seat shaping member butting against the back surface of the backrest is installed so that it can be turned as the angle of inclination of the backrest is changed. Therefore, the seat shaping member controls the position of the backrest such that when the backrest is in its relatively raised state, substantial alignment between the backrest and head guard is obtained, with the backrest being relatively lowered. Thus, when it is deformed into a bed form, the bent state of the backrest and head guard is obtained and the head guard performs its inherent function. Therefore, a baby carriage seat assembly is obtained which does not give an uneasy feeling to the baby placed in the baby carriage and which satisfies safety standards.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a side view of an arrangement associated with the seat assembly of the baby carriage of FIG. 1, shown in an overlapped state;

FIG. 4 shows the backrest of FIG. 3 in its somewhat lowered state, and FIG. 5 shows it in its most lowered state;

FIG. 7 is a side view showing the external appearance of the angle fixing means for the backrest angle changing mechanism of FIG. 6;

FIG. 8 is a side view shown with the operating knob for the mechanism of FIG. 7 removed;

FIGS. 9 through 11 are a front view, a left-hand side view and a rear view, respectively, of the long connecting member of FIG. 8;

FIG. 12 is a front view of the short connecting member of FIG. 8;

FIG. 17 is a side view showing the relation between the backrest retaining member and the seat shaping member in a state corresponding to the state shown in FIGS. 7 and 8;

FIG. 18 is a side view showing the state of the head guard relative to the backrest in the state shown in FIG. 17;

FIGS. 23 through 25 show a further embodiment of this invention, with FIGS. 23, 24 and 25 illustrating states corresponding to those of FIGS. 17, 20 and 21, respectively.

DESCRIPTION OF THE PREFERRED EMBODIMENTS

Figure 1:
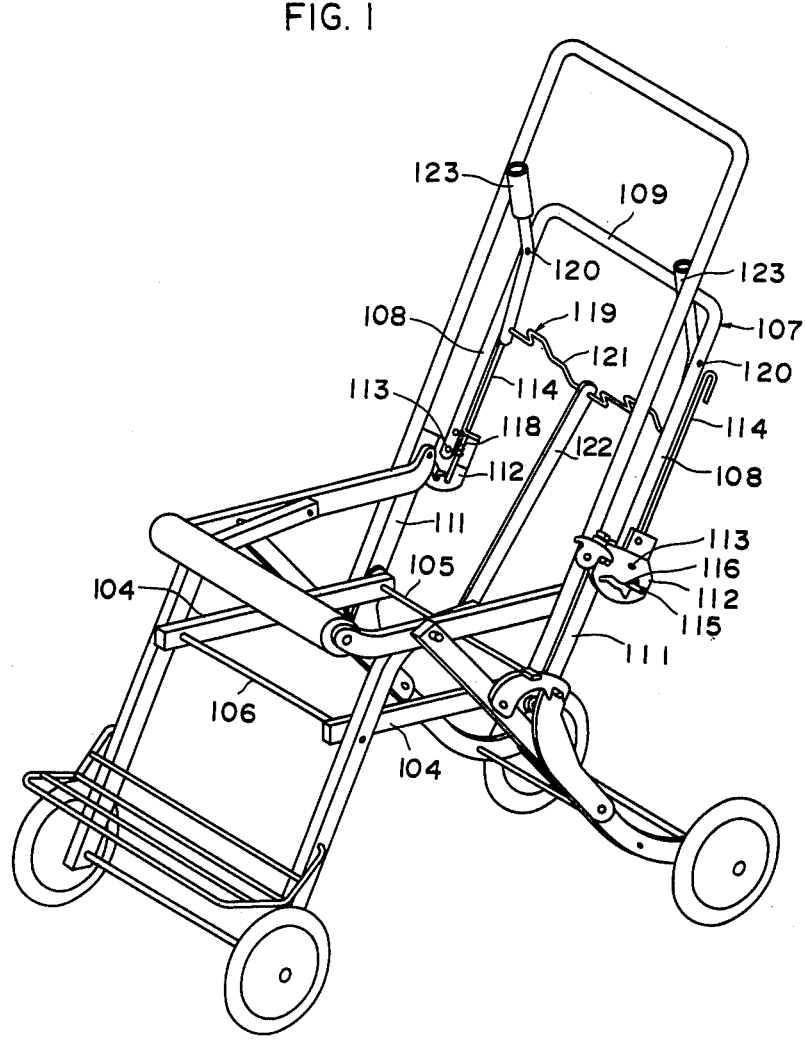
FIG. 1 is a perspective view showing the skeleton of a baby carriage including an embodiment of the invention.
Figure 2:
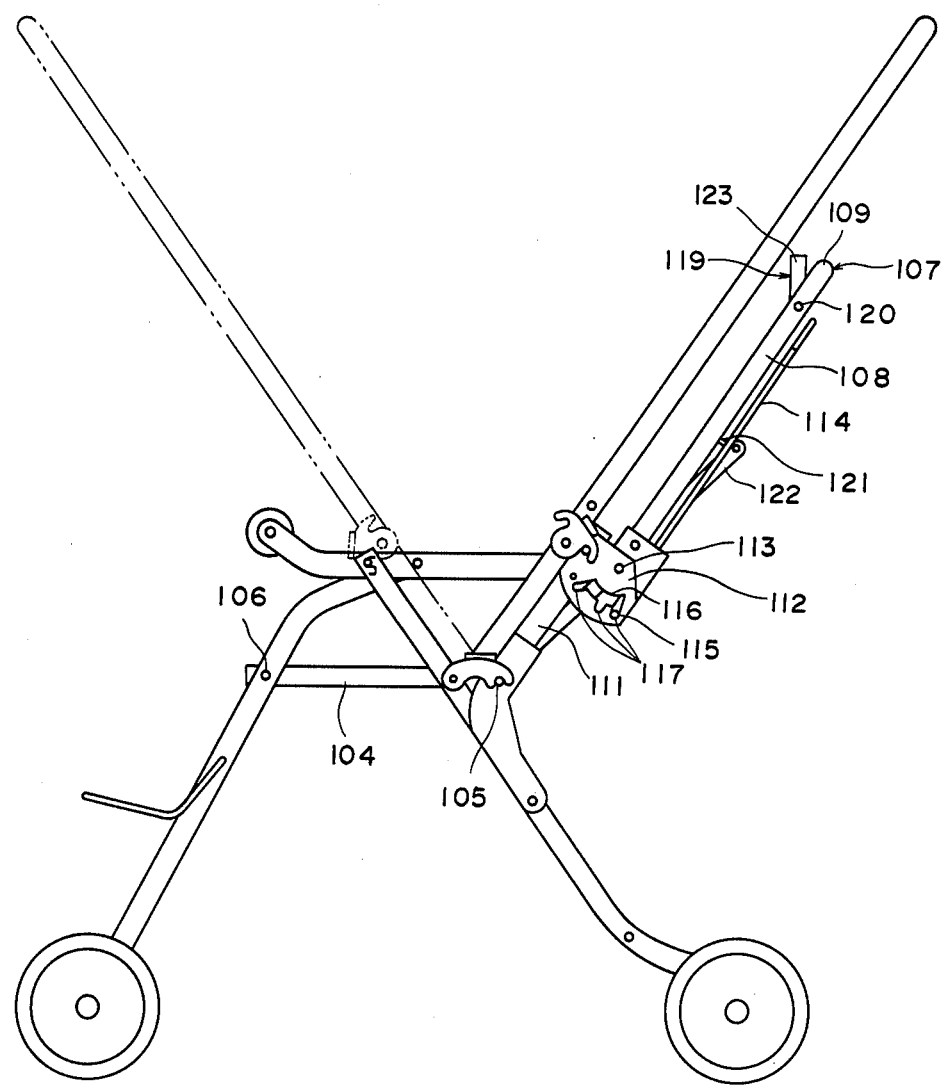
FIG. 2 is a side view of the skeleton of the baby carriage of FIG. 1.

FIG. 1 is a perspective view showing the skeleton of a baby carriage including an embodiment of the invention. FIG. 2 is a side view of the skeleton of the baby carriage of FIG. 1. FIG. 3 is a side view of an arrangement associated with the seat assembly of the baby carriage of FIG. 1, shown in an overlapped state. FIG. 4 shows the backrest of FIG. 3 in its somewhat lowered state, and FIG. 5 shows it in its most lowered state.

As shown in FIGS. 1 and 2, the baby carriage includes various components, most of which are for the purpose of making the baby carriage foldable. Therefore, only those components which are of interest to this invention will be described below.

As shown in FIGS. 3 through 5, the seat assembly for the baby carriage comprises a seat 101, a backrest 102 and a head guard 103. The seat 101, backrest 102 and head guard 103 are each constructed with a hard core material incorporated therein for prevention of buckling thereof. A fabric or the like is applied to these core materials to cover the same. The fabric foldably connects the rear end edge of the seat 101 to the lower end edge of the backrest 102 and the upper end edge of the backrest 102 to the lower end edge of the head guard 103.

The seat 101 is disposed on a plane defined by a pair of longitudinally extending lower connecting rods 104, a rear shaft 105 and a front shaft 106, as shown in FIGS. 1 and 2. The backrest 102 and head guard 103 are substantially held by an inverted U-shaped reclining rod 107. More particularly, the reclining rod 107 comprises a pair of backrest retaining members 108 and a head guard retaining member 109 which are formed as a unit. The backrest retaining members 108 are connected at their lateral edges to foldable lateral surface portions 110 (FIG. 5). The foldable lateral surface portions 110 are formed of a foldable sheet material, e.g., a fabric. The outer end edges of the foldable lateral surface portion 110 extend along and are connected to the backrest retaining members 108, whereby the backrest 102 is retained by the retaining members 108. The head guard 103 is attached at its upper end edge to the head guard retaining member 109, which extends widthwise.

The backrest retaining members 108 are installed so that their angle of inclination with the baby carriage main body can be changed. More particularly, rear support rods 111, which are components of the main body of the baby carriage, each have an adjusting attachment 112 fixed thereto, and the reclining rod 107 is turnably installed by adjusting pivot pins 113 provided on said reclining adjusting attachments 112. Operating rods 114 are provided for fixing the angle of the reclining rod 107 at a plurality of (e.g., three) adjusted positions. The operating rods 114 have their lower ends outwardly bent to form engagement pins 115. Each engagement pin 115 is movable in an arcuate hole 116 in the associated adjusting attachment 112. Extending from the arcuate hole 116 are engagement recesses (e.g., three) 117. When the operating rods 114 are moved along their long axis, the engagement pins 115 each engage any one of the engagement recesses 117, and in order to assist in the downward movement of such operating rod 114, a spring 118 is provided. The operating rods 114 move vertically in parallel with the backrest retaining rods 108. Thus, their upward displacement renders the reclining rod 107 turnable, and when they are displaced downwardly to bring the engagement pins 115 into engagement with any of the engagement recesses 117, the backrest retaining members 108 are fixed at an adjusted angle of inclination.

A seat shaping member 119 is turnably supported through pivot pins 120 with respect to the backrest retaining members 108. The seat shaping member 119 includes a U-shaped portion, at whose opposite ends the pivot pins 120 are positioned. The widthwise extending portion 121 of the U-shaped portion is bent stepwise. As shown in FIGS. 3 through 5, the front of the widthwise extending portion 121 abuts against the back surface of the backrest 102. The rear portion of the widthwise extending portion 121 is operatively connected to the rear shaft 105, which is a fixed portion of the baby carriage main body, by a connecting link 122. The connecting link 122 is preferably formed of a rigid rod. If the connecting link 122 is made of such material, the motion can be reversibly positively transmitted to the seat shaping member 119. If this advantage is not desired, the connecting link 122 may be formed of a flexible belt. Formed as a unit and extending upwardly from the seat shaping member 119 are hood attaching elements 123. The hood attaching elements 123 are formed with holes in their upper end surfaces for receiving an unillustrated hood retaining element and serve to attach a hood extending forwardly from this position.

Referring to FIGS. 3 through 5, the operation of the seat assembly of the baby carriage will now be described.

FIG. 3 shows the backrest 102 in its most raised state. In this state, the widthwise extending portion 121 of the seat shaping member 119 abuts against the back surface of the backrest 102 to fix the angle of inclination of the backrest 102 in the most raised state. Further, at this time, the head guard 103 which is connected to the upper end edge of the backrest 102, is positioned substantially on a single plane in alignment with the backrest 102.

FIG. 4 shows a backrest 102 in a further lowered state as compared with the FIG. 3 state. In this state also, the widthwise extending portion 121 of the seat shaping member 119 abuts against the back surface of the backrest 102 to fix the angle of inclination of the backrest 102, with the head guard 103 aligned with the backrest 102 on a single plane. That is, in the FIG. 4 state, in spite of the fact that the backrest retaining members 108 are further lowered as compared with the FIG. 3 state, the angle between the seat shaping member 119 and the connecting link 122 remains almost unchanged. As a result, the alignment between the backrest 102 and the head guard 103 is also maintained in the state shown in FIG. 4.

FIG. 5 shows the backrest 102 in its lowest state. In this state, with the backrest retaining members 108 further lowered, the angle of intersection between the seat shaping member 119 and the connecting link 122 is changed such that they are greatly bent. As a result, the widthwise extending portion 121 of the seat shaping member 119 is brought to a position considerably downwardly spaced apart from the backrest retaining members 108. If the back surface of the backrest 102 abuts against said widthwise extending portion 121, a box-like bag will be defined with the backrest serving as the bottom and the head guard 103 and flexible lateral surface portions 110 serving as the lateral surfaces. The head guard 103 constituting one lateral surface of the bag is greatly bent relative to the backrest 102. When the backrest 102 is most lowered with the seat assembly assuming a bed form, the head guard 103 assumes a position opposed to the top of the baby's head.

Figure 6:
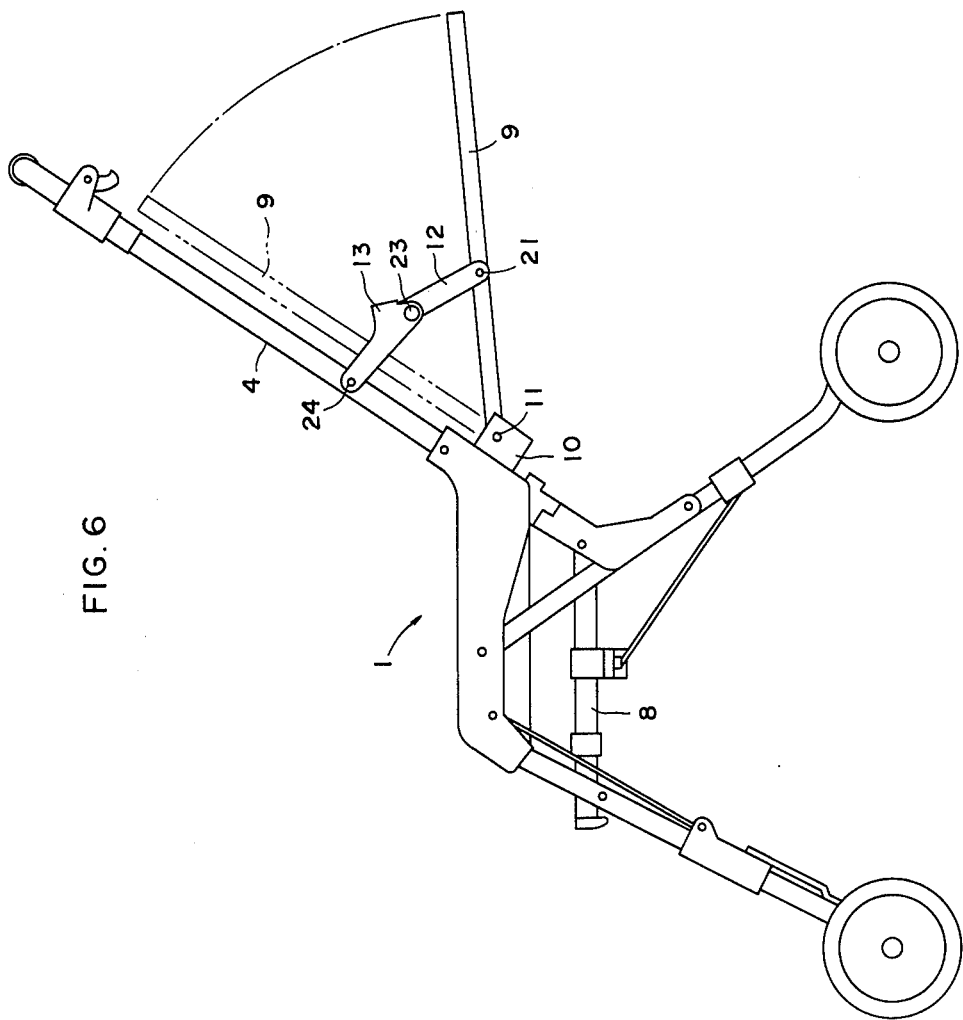
FIG. 6 is a side view showing the skeleton of a baby carriage including another embodiment of this invention, in which only a mechanism for changing the angle of inclination of the backrest is shown.
Figure 13:
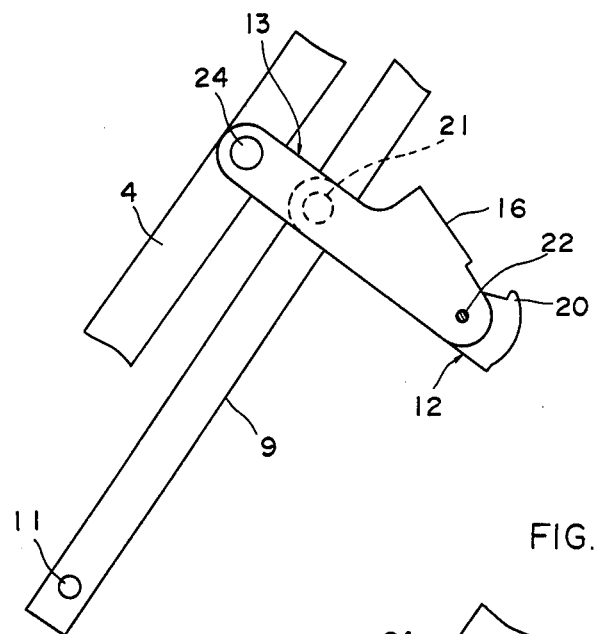
FIGS. 13 through 16 are side views showing a series of typical operating states obtained by changing the FIG. 8 state.

FIG. 6 is a side view showing the skeleton of a baby carriage including another embodiment of this invention, in which a mechanism for changing the angle of inclination of the backrest is shown. In the baby carriage shown therein, only those components which are of interest to this invention will be described.

The seat assembly attached to this baby carriage comprises a seat, a backrest and a head guard, as is also clear from a description to be given later with reference to FIG. 17 and the figures that follow it. The seat is attached, e.g., to laterally extending members 8 included in the baby carriage main body 1. The backrest is retained by backrest retaining members 9 turnably attached to connectors 10 through pivot pins 11 thereon, said connectors being provided, e.g., on the lower ends of manual pusher rods 4 (said lower end portions not appearing in FIG. 6 as they are hidden behind other members). The angle of inclination of the backrest may be fixed by adjusting the angle of inclination of the backrest retaining members 9 in a suitable state; this may be attained, e.g., by adjusting the angle between the manual pusher rods 4 and the backrest retaining members 9, thereby fixing them in the adjusted position. It can be seen that to this end the pusher rods 4 and the backrest retaining member 9 may be connected by a suitable connecting member so that the distance between the opposite ends of said connecting member may be changed.

A mechanism for changing the angle of inclination of the backrest retaining members 9 will now be described. FIG. 7 is a side view showing the external appearance of angle fixing means for the backrest angle changing mechanism of FIG. 6. FIG. 8 is a side view shown with the operating knob for the mechanism of FIG. 7 removed. FIGS. 9 through 11 are a front view, a left-hand side view and a rear view, respectively, of the long connecting member of FIG. 8. FIG. 12 is a front view of the short connecting member of FIG. 8. FIGS. 13 through 16 are side views showing a series of typical operating states obtained by changing the FIG. 8 state.

As also shown in FIG. 6, for adjustment of the angle between the manual pusher rods 4 and the backrest retaining members 9, there are provided a short connecting member 12 and a long connecting member 13 which form a pair. In addition, the state of the backrest retaining members 9 shown in solid lines in FIG. 6 corresponds to FIG. 16 and the state of the backrest retaining members 9 shown in phantom lines corresponds to FIGS. 7 and 8. Connecting members 12 and 13 and the manner of their connection will now be described in detail.

The long connecting member 13, as shown singly in FIGS. 9 through 11, is provided with round holes 14 and 15 at its ends. It is formed with an end defining element 16 on its lateral side whose function will become apparent from a description to be given later. In this embodiment, there is formed a reinforcing element 17 extending from the end defining element 16 to provide a double layer construction. The double layer construction, including the reinforcing element 17, enables the short connecting member 12 to be positioned between the layers, as will be later described. In addition, the hole 15 extends through the reinforcing element 17.

The short connecting member 12, as shown singly in FIG. 12, is provided at one end thereof with a round hole 18 and at the other end thereof with an elongated hole 19. The elongated hole 19 extends slightly curved. The lateral portion of the short connecting member 12 where the elongated hole 19 exists is formed with a slightly projecting horn portion 20. The function of this horn portion 20 will become apparent from a description to be given later.

As shown in FIGS. 6 through 8 and 13 through 16, the short connecting member 12 is turnably connected at one end thereof to the backrest retaining member 9 by a first pivot pin 21 inserted into the hole 18. The other end of the short connecting member 12 is interposed between the reinforcing element 17 formed on one end of the long connecting member 13 and the main body portion of the long connecting member 13. In this state, the elongated hole 19 and the hole 15 are aligned with each other to receive a second pivot pin 22 therein. Thereby, the other end of the short connecting member 12 is turnably connected to one end of the long connecting member 13. In addition, the second pivot pin 22 also retains an operating knob 23 disposed outwardly of the long connecting member 13. The long connecting member 13 is turnably connected at the other end thereof to the manual pusher rod 4, which is a fixed member, by a third pivot pin 24 inserted in the hole 14.

In addition, in the connected state of the short and long connecting members 12 and 13, the distance between the first and second pivot pins 21 and 22 is selected so that it is shorter than the distance between the second and third pivot pins 22 and 24. The operation and movement of the reclining mechanism described so far will now be described.

The state shown in phantom lines in FIG. 6 and the state shown in FIGS. 7 and 8 illustrate the backrest retaining member 9 in its most raised position. In this state, the short connecting member 12 abuts against the end defining element 16 of the long connecting member 13, whereby the end of turning of the short connecting member 12 is defined to turn around the axis of the second pivot pin 22 in one direction, i.e., a clockwise direction as viewed in the figure. Therefore, even if the backrest retaining member 9 is loaded, the distance between the first and second pivot pins 21 and 24 is maintained unchanged and hence the backrest retaining member 9 is maintained in its most raised, inclined state. The backrest retaining member 9 is constructed so that it can be adjusted to this most raised, inclined state, a further lowered intermediate inclined state and the lowest inclined state. Adjustment of such inclined states is effected by the operating knob 23.

The intermediate inclined state can be established by applying counterclockwise force to the long and short connecting members 12 and 13 in the FIG. 7 or 8 state through the operating knob 23. In response thereto, a state shown in FIG. 13 can be obtained. This state is one in which the long and short connecting members 12 and 13 are placed one upon the other. In this state, the positional relation of the first through third pivot pins 21, 22 and 24 is such that the backrest retaining member 9 has been turned slightly counterclockwise around the axis of the pivot pin 11. In the FIG. 13 state, application of further counterclockwise force on the operating knob 23 (second pivot pin 22) will provide a state shown in FIG. 14. That is, the short connecting member 12 moves beyond the FIG. 13 state in which it lies under the long connecting member 13. It follows, that during this movement, the short connecting member 12 turns counterclockwise around the axis of the second pivot pin 22.

Figure 14:
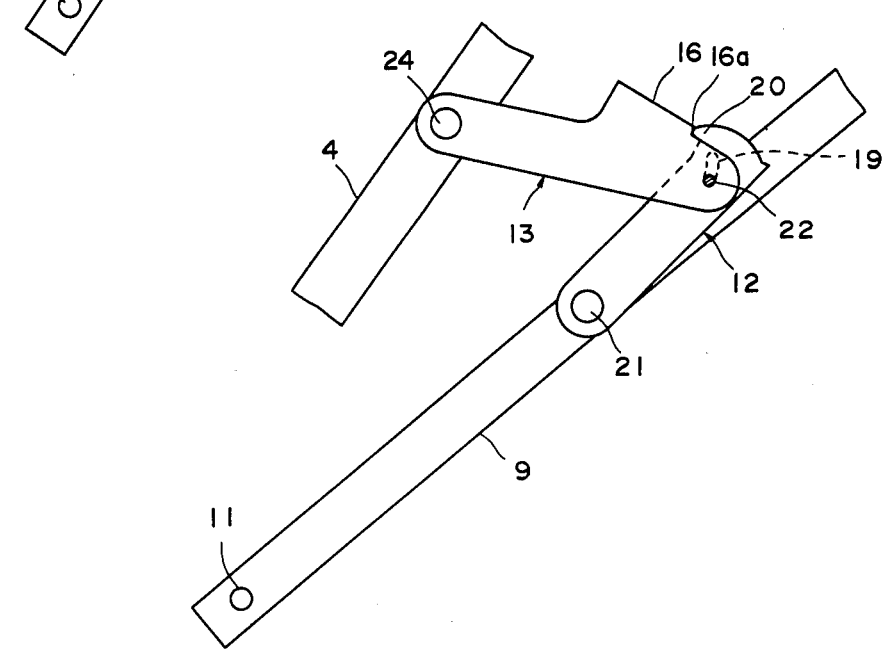

The FIG. 14 state shows that the horn 20, which is part of the long connecting member 12, butts against the end 16a of the end defining element 16, which is part of the long connecting member 13. At this time, the second pivot pin 22 is positioned at the lower end of the elongated hole 19. That is, the elongated hole 19, in this state, extends at right angles to the direction in which the long connecting member 13 extends. This state is such that because of said butting state the short connecting member 12 cannot turn any further around the axis of the second pivot pin 22. Therefore, the angle between the short and long connecting members 12 and 13 is fixed and hence the distance between the first and third pivot pins 21 and 24 is fixed, so that the backrest retaining member 9 is maintained in the intermediate inclined state.

In addition, in this embodiment, the horn 20 has been shown projecting from the side of the short connecting member 12, but such arrangement is not absolutely required. For example, the same effect may be obtained by further extending the end 16a of the end defining element 16.

Figure 15:
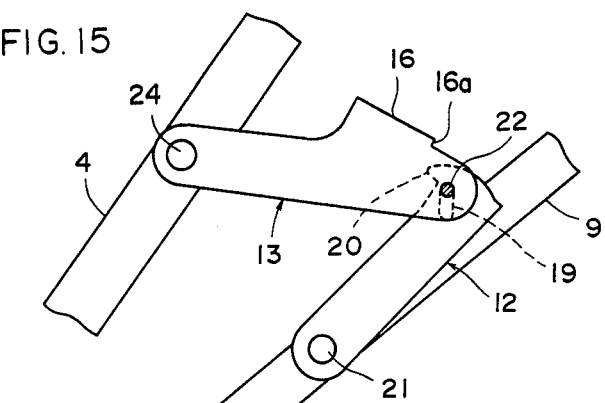
Figure 16:
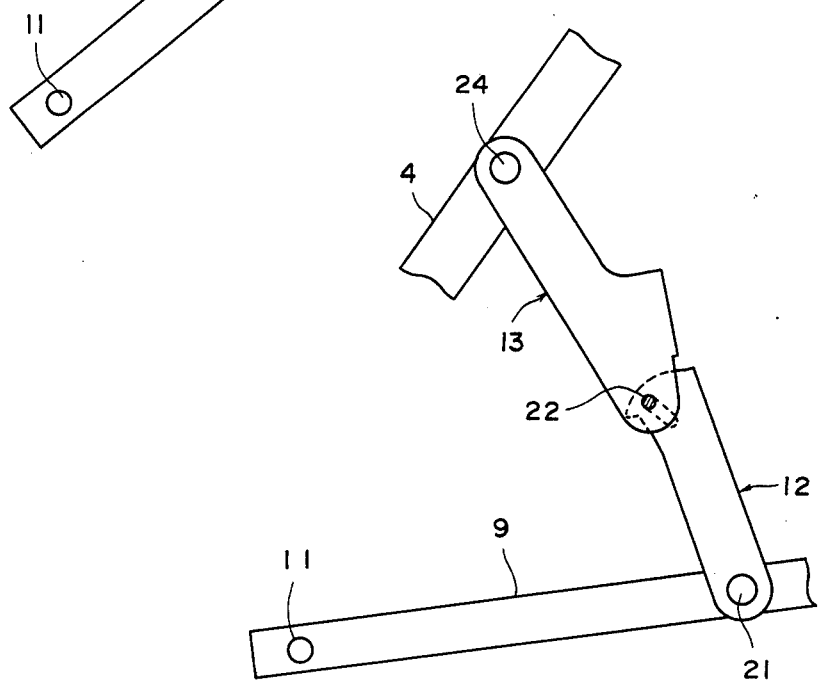

The change of the FIG. 14 state to the most inclined state involves lifting the operating knob 23 (second pivot pin 22) against gravity and other forces to position the second pivot pin 22 at the upper end of the elongated hole 19. This state is shown in FIG. 15. In the FIG. 15 state, the horn 20 does not butt against the end 16a of the end defining element 16. Therefore, the short connecting member 12 can be further turned counterclockwise around the axis of the second pivot pin 22. In this state, if force is applied to the operating knob 23 and secondarily to the backrest retaining member 9 to turn the short connecting member 12 counterclockwise, the latter is aligned with the long connecting member 13. This state is shown in FIG. 16. The FIG. 16 state is one in which the backrest retaining member 9 is in its lowest state.

In this way, the backrest retaining member 9 can have its inclined state changed in three steps and can be fixed in each of its adjusted states. In addition, the return from the FIG. 16 state to the FIG. 14 state and to the FIG. 7 state may be effected by reversing the above operation to produce reverse movement. Thus, the inclined state of the backrest retaining member can be reversibly adjusted as desired.

Figure 19:
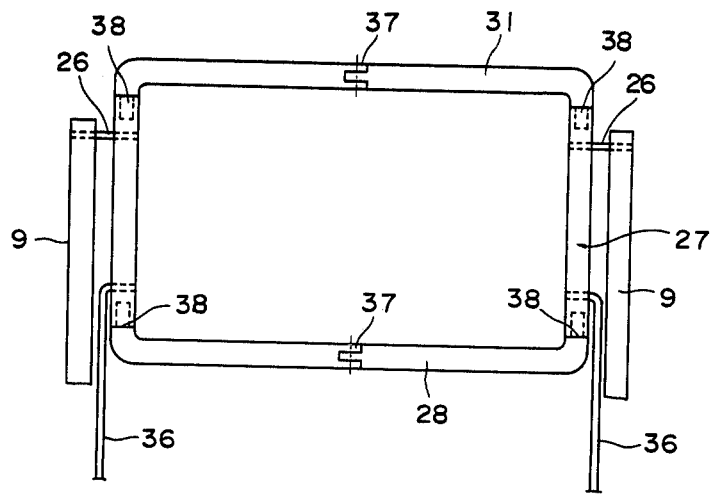
FIG. 19 is a front view of the seat shaping member, showing its arrangement.
Figure 20:
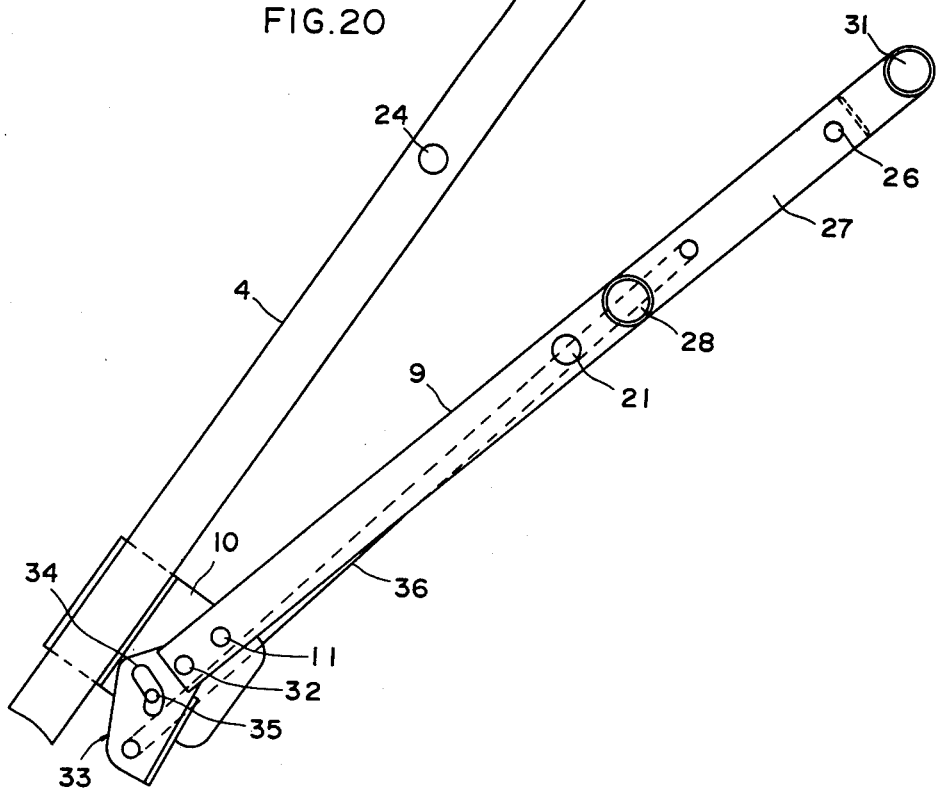
FIG. 20 is a side view showing the relation between the backrest retaining member and the seat shaping member in a state corresponding to the state shown in FIG. 14.
Figure 21:
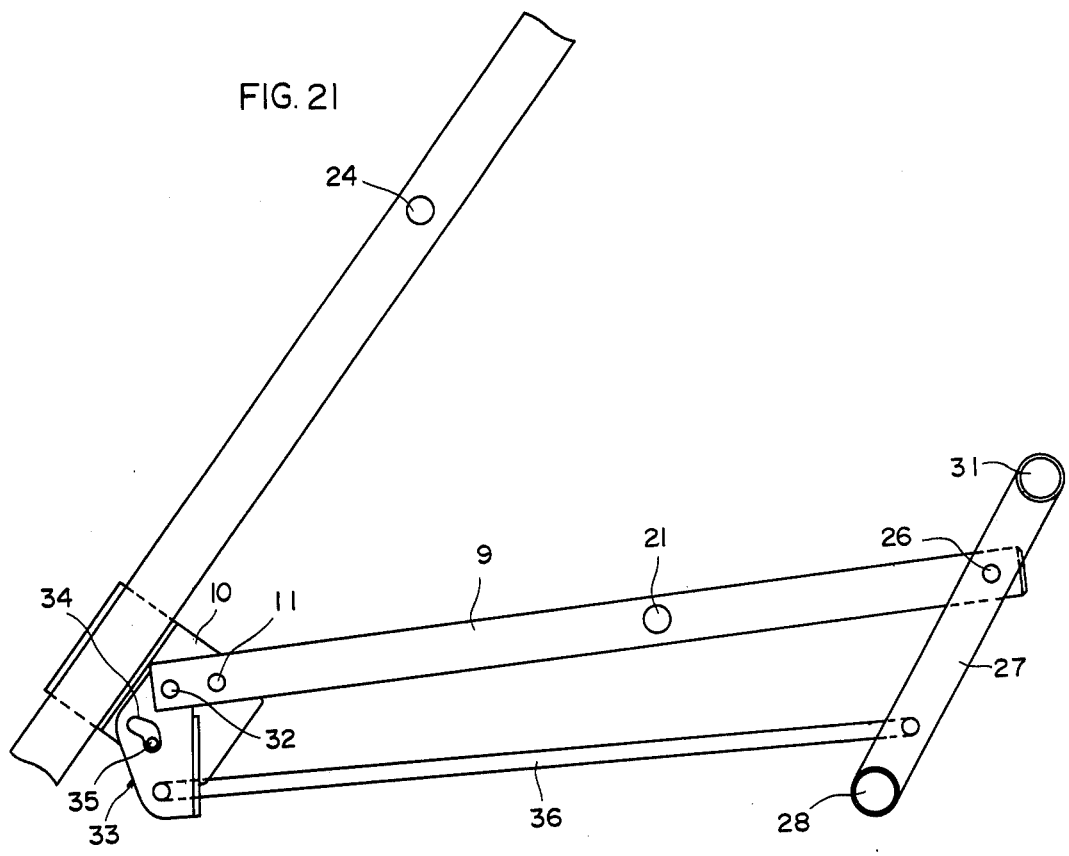
FIG. 21 is a side view showing the relation between the backrest retaining member and the seat shaping member in a state corresponding to FIG. 16.
Figure 22:
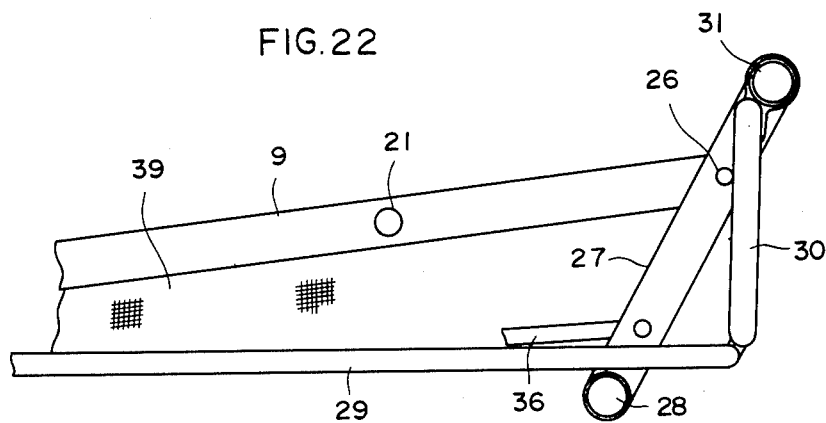
FIG. 22 is a side view showing the state of the backrest and head guard in the state shown in FIG. 21.

Added to the arrangement described above for changing the angle of inclination of the backrest retaining member 9 is an arrangement described below. FIG. 17 is a side view showing the relation between the backrest retaining member and the seat shaping member in a state corresponding to the state shown in FIGS. 7 and 8. FIG. 18 is a side view showing the state of the head guard relative to the backrest in the FIG. 17 state. FIG. 19 is a front view of the seat shaping member, showing its arrangement. FIG. 20 is a side view showing the relation between the backrest retaining member and the seat shaping member in a state corresponding to the FIG. 14. FIG. 21 is a side view showing the relation between the backrest retaining member and the seat shaping member in a state corresponding to FIG. 16. FIG. 22 is a side view showing the state of the backrest and head guard in the FIG. 21 state. In addition, illustration of the connecting members 12 and 13 described above is omitted in FIGS. 17 through 22, but only the first and third pivot pins 21 and 24 are shown in these figures to clarify the relation to FIGS. 7, 8, 14 and 16.

Referring to FIGS. 17 through 19, the upper ends of the backrest retaining members 9 turnably support the seat shaping member 27 through pivot pins 26. The seat shaping member 27, as best shown in FIG. 19, is of rectangular frame construction as a whole. The U-shaped portion of the rectangle, consisting of the bottom and opposite lateral sides, performs the seat shaping function. The said pivot pins 26 are positioned at both ends of the U-shaped portion. The widthwise extending portion 28 of the U-shaped portion, as shown in FIG. 18, abuts against the back surface of the backrest 29. The backrest 29, though not particularly shown, is foldably connected to the rear end edge of the seat. The back rest 29 is constructed with a hard core material incorporated therein. The head guard 30 is foldably connected to the upper end edge of the back rest 29. The head guard 30 is also constructed with a hard core material incorporated therein. Foldable connection between such backrest 29 and head guard 30 can be easily made, e.g., by integrally covering these hard core materials with a fabric or the like. The portion forming the upper side of the seat shaping member 27 provides the head guard retaining member 31. Therefore, the upper end edge of the head guard 30 is connected to this head guard retaining member 31. Means corresponding to the hood attachment elements 123 shown in FIGS. 1 and 2 may be attached to the head guard retaining member 31.

The lower end of the backrest retaining member 9, disposed below the backrest pivot pin 11, is provided with a pivot pin 32, whereby an intermediate link 33 is turnably connected to the backrest retaining member 9. The intermediary link 33 is formed with a substantially C-shaped guide hole 34. The guide hole 34 receives a guide pin 35, which is provided on the connector 10. When the backrest retaining member 9 is turned around the axis of the backrest pivot pin 11, the attitude of the intermediary link 33 is subtly changed while its guide hole 34 is being guided by the guide pin 35. The intermediary link 33 and the seat shaping member 27 described above are operatively connected together by a rigid connecting link 36 formed of a rod.

As shown in FIG. 19, the seat shaping member 27 is foldably constructed, and may be so constructed that its width can be reduced. Such construction is advantageous where the baby carriage main body 1 will be reduced in width when folded. More particularly the seat shaping member 27 is formed with foldable portions 37 and twistable portions, whereby folding is allowed. When the baby carriage main body 1 is thus reduced in width in response to folding thereof, it is necessary that the backrest 29 and head guard 30 also be folded. Therefore, the hard core materials contained therein are preferably divided into a plurality of longitudinally extending portions which can be folded through longitudinally extending folds.

As shown in FIG. 18, with the backrest retaining member 9 in its most raised state, the seat shaping member 27 is aligned with the backrest retaining member 9. In this case, since the back surface of the backrest 29 abuts against the widthwise extending portion 28 of the seat shaping member 27, the backrest 29 and head guard 30 are substantially aligned with each other on a plane.

FIG. 20 shows the backrest retaining member 9 more lowered than it is shown in FIG. 17. It should be noted that the relative positional relation between the backrest retaining member 9 and the intermediary link 33 remains unchanged while this state is established. This is because when the backrest retaining member 9 is turned, the intermediary link 33 retained at the end thereof through the pivot pin 32 allows the guide pin 35 to be displaced in the guide hole 34 without any resistance. Therefore, the backrest retaining member 9 and intermediary link 33 turn in a unit. Under such circumstances, there is no possibility of the attitude of the seat shaping member 27 being changed relative to the backrest retaining member 9 through the connecting link 36, and the relative positional relation between the backrest and the head guard 30 shown in FIG. 18 is maintained unchanged.

FIGS. 21 and 22 show the lowest state of the backrest retaining member 9. While the state shown in FIG. 20, as described above, is changed to the state shown therein, the backrest retaining member 9 is turned further. As the backrest retaining member 9 is turned, the intermediary link 33 is also turned around the axis of the backrest pivot pin 11, during which, however, it becomes difficult for the guide pin 35 to move within the guide hole 34 without resistance. That is, the guide pin 35 abuts against part of the end edge defining the guide hole 34. This prevents turning of the intermediary link 33 together with the backrest retaining member 9. That is, this preventive state is followed by the turning of the intermediary link 33 around the axis of the guide pin 35. The torque is imparted from the backrest retaining member 9 through the pivot pin 32. Such turning of the intermediate link 33 causes movement of the connecting link 36 toward the front end of the back rest retaining member 9. As a result of this turning, the widthwise extending portion 28 of the seat shaping member 27 is brought to a position spaced downwardly apart from the backrest retaining member 9. Therefore, the back rest 29, whose back surface abutted against the widthwise extending portion 28, falls downwardly. Connected to opposite lateral edges of the backrest 29 are foldable lateral surface portions 39 formed of a foldable sheet material, whose lateral edges are attached to the backrest retaining member 9. Therefore, in the state shown in FIG. 22, a box-like bag is formed, with its bottom defined by the backrest and its lateral surfaces defined by the head guard 30 and foldable lateral surface portions 39. In this state, the backrest 29 and head guard 30 are greatly bent. Here, the head guard 30 assumes an attitude opposed to the top of the baby's head.

Figure 25:
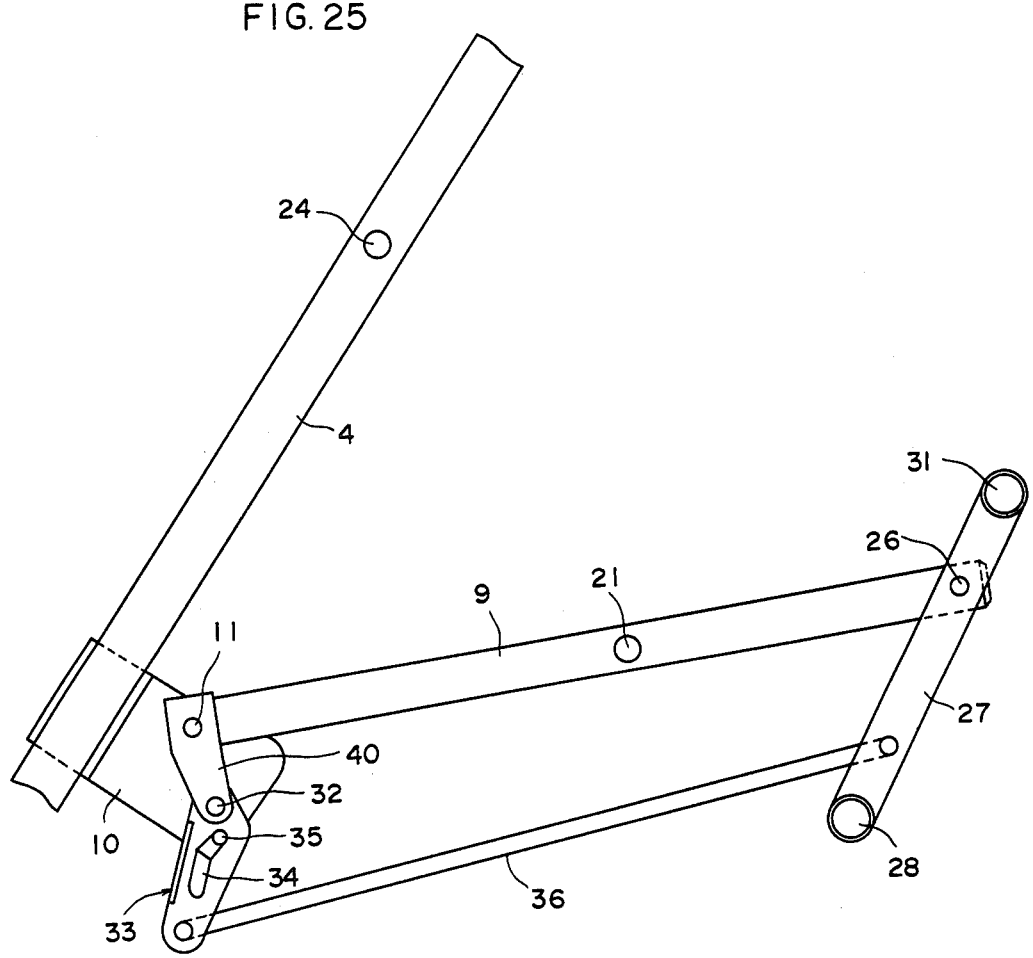

FIGS. 23 through 25 show a further embodiment of this invention, with FIGS. 23, 24 and 25 illustrating states corresponding to those of FIGS. 17, 20 and 21, respectively. The mechanism for changing the angle of inclination of the backrest used in the embodiment shown in FIGS. 23 through 25 is the same as that previously described with reference to FIGS. 6 through 16. The relation between the backrest retaining member and the seat shaping member described with reference to FIGS. 17 through 22 is slightly modified in this embodiment. Therefore, the reference characters used in FIGS. 17 through 22 will be used in FIGS. 23 through 25 to denote corresponding parts.

The substantial difference of this embodiment from the preceding embodiment is that the pivot pin 32 for imparting torque from the backrest retaining member 9 to the intermediary link 33 is not provided directly on the backrest retaining member 9 but on the front end of a bracket 40 attached to the end of the backrest retaining member 9. However, it is substantially the same as in the preceding embodiment in that the pivot pin 32 is displaced in response to the turning of the backrest retaining member 9 around the axis of the pivot pin 11.

Reference will now be made to operation. During change of the FIG. 23 state to the FIG. 24 state, the intermediary link 33 slightly changes the relative positional relation to the backrest retaining member 9 to the extent that the connecting link 36 actuated the seat shaping member 27. Therefore, thought not shown, the alignment between the backrest and the head guard is maintained unchanged.

In the course from the FIG. 24 state to the FIG. 25 state, the guide pin 35 reaches the end of the guide hole 34. Therefore, the guide pin 35 abuts against part of the end edge defining the guide hole 34, and the intermediary link 33 is turned through a large angle around the axis of the guide pin 35. This torque is transmitted from the backrest retaining member 9 through the bracket 40 and pivot pin 32. As a result of the turning of the intermediary link 33, the connecting link 36 is displaced toward the front end of the backrest retaining member 9. In response thereto, the seat shaping member 27 is turned counterclockwise as viewed in the figure. This state is shown in FIG. 25, and the attitude of the seat shaping member 27 at this time is the same as that shown in FIG. 22. Therefore, the backrest 29 and head guard 30 are greatly bent relative to each other, as shown in FIG. 22.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A seat assembly for baby carriages comprising:
   a seat,
   a backrest foldably connected to rear end edge of said seat and constructed with a hard core material incorporated therein,
   a hed guard holdably connected to the upper end edge of said backrest and constructed with a hard core material incorporated therein,
   a pair of backrest retaining members whose angle of inclination with a fixed member of the baby carriage main body can be changed,
   angle fixing means for fixing changed angles of inclination of said backrest retaining members at a plurality of adjusted positions,
   foldable lateral surface portions which, in cooperation with said head guard, define the lateral surfaces of a bag with the bottom surface thereof defined by said backrest, said lateral surface portions being connected to said backrest retaining members and formed of a foldable sheet material,
   a head guard retaining member extending widthwise and serving to connect the upper end of said head guard above said backrest retaining members,
   a seat shaping member including a portion extending in a U-shape, rotatably supported with respect to said backrest retaining members at opposite end of the U-shaped portion, with the widthwise extending portion of the U-shaped portion abutting against the back surface of said backrest, and
   operative connecting means operatively connected to said seat shaping member to change the attitude of the seat shaping member in operative association with changes in the angle of inclination of said backrest retaining members, whereby when said backrest retaining members are in their raised state, the widthwise extending portion of said seat shaping member is brought into abutment against the back surface of said backrest to align said backrest and said head guard substantially in a plane while involving the folding of said foldable lateral surface portions and when said backrest retaining members are in their relatively lowered state, the widthwise extending portion of said seat shaping member is displaced to be positioned on the back surface of the backrest forming the bottom of said bag in such a manner as to form said bag, with said foldable lateral surface portions being stretched, with said backrest and said head guard crossing each other and with said backrest forming the bottom and said head guard and said foldable lateral surface portions forming the lateral surfaces of said bag.

2. A seat assembly for baby carriages as set forth in claim 1, wherein said head guard retaining member is integrated with said back rest retaining members and connects the upper ends of said pair of backrest retaining members.

3. A seat assembly for baby carriages as set forth in claim 1, wherein said head guard retaining member is integrated with said seat shaping member and connects the upper ends of said pair of backrest retaining members.

4. A seat assembly for baby carriages as set forth in any one of claims 1 or 2 or 3, wherein said operative connecting means include connecting links for operatively connecting the fixed portion of the baby carriage main body and said seat shaping member.

5. A seat assembly for baby carriages as set forth in any one of claims 1 or 2 or 3, wherein said operative connecting means include intermediary links adapted to be displaced according to changes in the angle of inclination of said backrest retaining members, and rigid connecting links for operatively connecting said intermediary links and said seat shaping member.

* * * * *